United States Patent [19]

Massarsky

[11] Patent Number: 5,500,700
[45] Date of Patent: Mar. 19, 1996

[54] METHOD OF CREATING A COMPOSITE PRINT INCLUDING THE USER'S IMAGE

[75] Inventor: Yefim Massarsky, Newton, Mass.

[73] Assignee: Foto Fantasy, Inc., Newton, Mass.

[21] Appl. No.: 153,674

[22] Filed: Nov. 16, 1993

[51] Int. Cl.⁶ ................................................. G03B 29/00
[52] U.S. Cl. ............................................. 354/76; 354/290
[58] Field of Search ....................... 358/22, 183; 354/76, 354/77, 78, 110, 120, 290, 291

[56] References Cited

U.S. PATENT DOCUMENTS

| | | | |
|---|---|---|---|
| 4,677,460 | 6/1987 | Fass et al. | 358/22 |
| 5,196,876 | 3/1993 | Thayer | 354/78 |

*Primary Examiner*—David M. Gray
*Attorney, Agent, or Firm*—Brian M. Dingman

[57] ABSTRACT

A method of creating a composite print including a preestablished background portion and a live portion comprising the steps of providing a plurality of different preestablished background images, allowing a user to select one background image at a time for display on a display device, obtaining an image of the user, displaying on the display device a composite image of the background image and the user image, and printing the composite image after sensing money input.

19 Claims, 5 Drawing Sheets

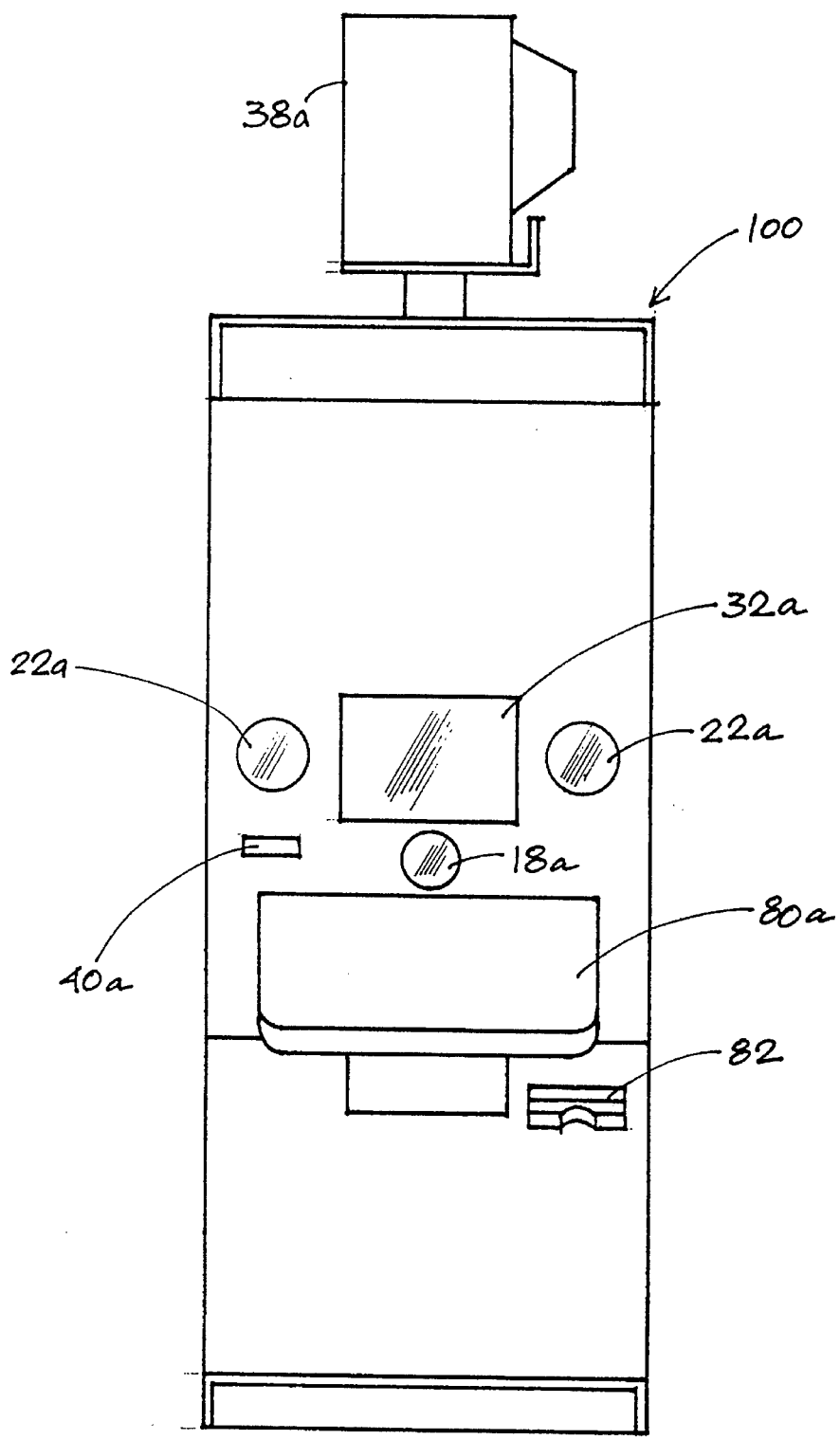
FIG_3

METHOD OF CREATING A COMPOSITE PRINT INCLUDING THE USER'S IMAGE

FIELD OF INVENTION

This invention relates to a method of creating a composite print including the user's image that is particularly adapted for use in a self-photography booth or kiosk.

BACKGROUND OF INVENTION

Self-photography booths have been used for years. The traditional booths included a camera that was actuated once the user inserted the correct amount of money. A timer mechanism was employed to take a number of flash pictures of the occupant or occupants of the booth.

With the advent of computer and video technology, the booths have been modernized. Video cameras allow a live image of the user to be taken. Video processing of the image then allows a photograph to be generated from that live image. Further, computer technology has allowed these devices to store in memory one or more background images which can be displayed together with the live video image on the booth monitor so that the printed image is a composite of the stored and user images.

All of these devices, however, require that the user insert a predetermined amount of money in order to actuate the device and then create the composite image print. With the digital video devices, the cost is relatively substantial, often in the $3.00 to $5.00 range for a single print. The user thus must decide to spend this sum of money before he or she can view the composite image. Accordingly, income is lost from potential user's who do not desire to spend $3.00 to $5.00 just to see whether or not there is an acceptable composite image that they would like to print.

SUMMARY OF INVENTION

It is therefore an object of this invention to provide a method of creating a composite print that is more conducive for use.

It is a further object of this invention to provide such a method which generates more income.

It is a further object of this invention to provide such a method which allows the user to view composite images for a portion of the money required to print a composite image.

It is a further object of this invention to provide such a method which allows different pricing for different backgrounds.

This invention results from the realization that self-photography booth use can be increased by allowing the user to view each of the background images merged with his or her image to form a composite image for a relatively small amount of money, and then giving the user the option of printing one or more copies of an acceptable composite image for additional money.

This invention features methods of creating a composite print including a preestablished background portion and a live portion. In one embodiment, the method includes the steps of providing a plurality of different preestablished background images, allowing a user to select one background image at a time for display on a display device, obtaining an image of the user, displaying on the display device a composite image of the background image and the user image, accepting sufficient money from the user, and then printing the composite image after sensing the money input. The background images may be stored in digital form, for example on the hard disk of a personal computer. They may be scrolled in sequence on a video monitor to entice potential users. Selection by the user of a background image may be facilitated by displaying each of the background images, for example by including samples of still photos of the background images that are available for viewing by the user before beginning use of the self-photography device. Preferably, the prints are mounted proximate an image selection device, such as a button, or displayed on a touch screen monitor. This allows the user to rapidly scan through a number of background images in a relatively short amount of time.

In a preferred embodiment, the user is required to deposit a sum of money to enable the selection of background images. This sum of money is typically relatively small, for example $0.50 to $1.00, so that potential users will be enticed to play with the self-photography booth to view a number of different composite images in order to decide whether there is an acceptable composite image that the user desires to print. It would be possible to allow users to purchase additional play time. The step of printing a composite image would include the requirement for the user to deposit an additional sum of money to enable the printing. There may be more than one such additional sum to allow the printing of one or more composite images. Also, different background images can be priced differently, particularly in the case of celebrity images which often require royalties to be paid for each use.

Preferably, the user image is a live video image, and the user is provided with the ability to freeze the live video image to allow the user to view a composite image before printing. Preferably, the background image display time is limited after the first sum of money is deposited to prevent a user from tying-up the booth and preventing others from using the device; more time may be purchased. The method may include the step of providing one or more warnings that time is about to expire, and automatically freezing the live image near the end of the display time to allow the user a last chance to view a composite image which can be selected for printing. There is preferably included some means for allowing the user to move the video image in relation to the background to assist in properly positioning the two images. Also, the method may further include the step of sequentially displaying each of the background images before a user selection of a background image for display. This sequential display may also be on a second display device which can be available for wider viewing to entice potential customers to the device.

In a more specific embodiment, the method of this invention includes the steps of providing a plurality of different preestablished background images, accepting a sum of money, and in response allowing the user a set time period to select one background image at a time for display on a display device. During that set time period, a live video image of the user is obtained, and displayed on the display device along with a background image to create a composite image. The user is provided with the ability to freeze the live image portion of the composite image for viewing an entire composite image for printing. An additional small amount of money may be deposited for additional time. An additional (final) sum of money may be accepted during the play time and when the live image is frozen, and in response the composite image is printed.

In another embodiment for use in a self-photography device, this invention features a method of creating a composite print including a background portion and a live portion. This method contemplates use of a device which includes a number of stored background images, a video camera for capturing a live image of a user, a video display for displaying a composite of the live image and background images, a device for accepting and counting money, and an image printer. The method includes the steps of inserting a sum of money in the device for accepting money, selecting a background image for display on the video display, positioning the video camera to place the live image in a desired relationship to the background image on the video display, freezing the live image to view a composite image for printing, and inserting another sum of money in the device for accepting money to cause the printing of the composite image including the frozen live image.

BRIEF DESCRIPTION OF THE DRAWINGS

Other objects, features and advantages will occur to those skilled in the art from the following description of preferred embodiments and the accompanying drawings, in which:

FIG. 3 is a front view of a self-photography booth including the systems of FIGS. 1 and 2.

DESCRIPTION OF PREFERRED EMBODIMENTS

This invention features several methods of creating a composite print including a preestablished background portion and a live portion. The methods are particularly suited for use with self-photography booths which have the capability of storing a number of preestablished images, called "background" portions or images herein. For example, a stored image could include a picture of a dollar bill with the George Washington bust removed. The booth includes a video camera which takes a live image of the user or users. This live image is then overlaid on the currently-chosen background image to create a composite image that is displayed on a monitor. For example, the user could position himself and/or the camera to capture a portrait image that would be displayed in the dollar bill where George Washington's bust would normally appear. The user is typically provided with the ability to "freeze" and "unfreeze" the live image to create a still composite image which can be viewed to allow the user to decide if the composite image is acceptable for printing. If it is not, the user can unfreeze the live image and choose another background image or reposition himself, for example, in the live image, to create a better composite image for printing.

Once the user finds an acceptable composite image during an initial "play" time, the user is instructed to add specified amounts of money for one or more prints of the current composite image. The print or prints are printed once sufficient money is received by the unit. Different background images may be priced differently, particularly when royalty payments are required by the celebrity in the image.

Figure 1:
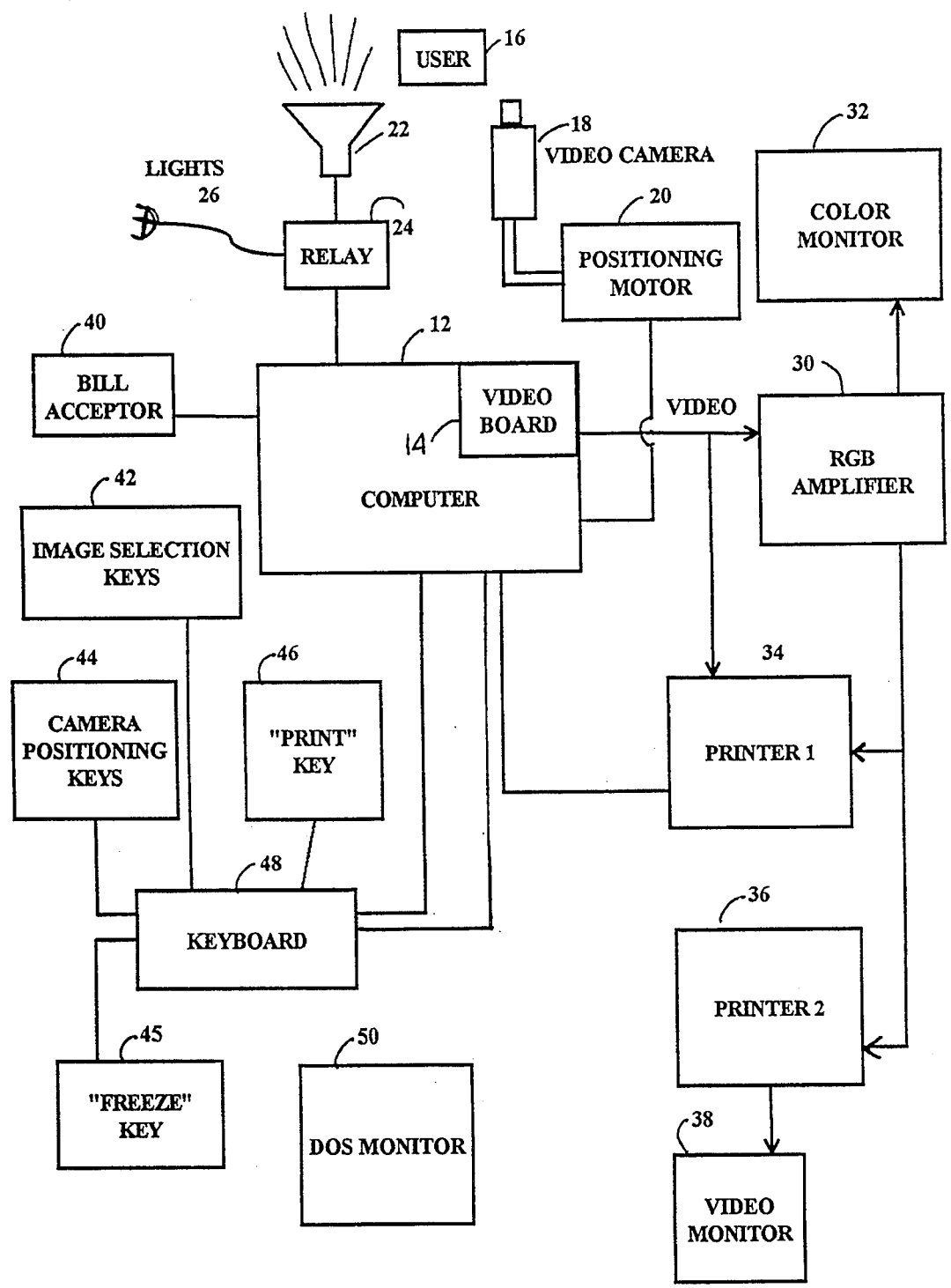
FIG. 1 is a schematic block diagram of a system for accomplishing the methods of this invention.

There is shown in FIG. 1 self-photography system 10 for practicing the method of this invention. System 10 includes personal computer 12 with video board 14 which may be a Targa Plus video adaptor board made by Truevision, Inc. Computer 14 also includes memory such as a hard disk, not shown. Video camera 18 is positioned to capture a portrait image or bust of user 16. The vertical and lateral position of video camera 18 may be changed by including a positioning motor 20 that is operated by the user using camera position keys 44. Lights 22 are preferably lit only when the device is in use. This may be accomplished by including relay 24 between power source 26 and light 22 which is energized by computer 12 on sensing by bill acceptor 40 of sufficient money to begin use of the device. For example, the user may be allowed five minutes of use for $1.00. During that time, the user uses image selection keys 42 to select from a number of stored background images that are displayed on monitor 32. Also displayed on monitor 32 is the image of the user captured by video camera 18. The images are superimposed in a standard manner by video board 14. The output of video board 14 is an RGB output that is amplified by amplifier 30 and provided to monitor 32 as well as the two video printers 34 and 36 that may be Polaroid TX-1500 printers. Each printer is capable of printing a photograph from a video image. The printers are enabled through computer 12 by the user's operation of the "print" key 46. Freeze key 45 allows the user to freeze and unfreeze the live video image, also a standard capability of video board 14. The composite image can also be displayed on external video monitor 38 that is capable of displaying a video image. Monitor 38 may face outside of the booth to allow others to view what the user views to entice use by such others.

In one embodiment, the system includes keyboard 48 and DOS monitor 50 that are accessible only by the owner or operator of the booth, for example, held behind a locked door. In this case, keys 44 through 46 and 42 may be hardwired directly to different keys of traditional keyboard 48 so that computer 12 can be programmed to accomplish the desired function on sensing of the correct keystroke.

Figure 2:
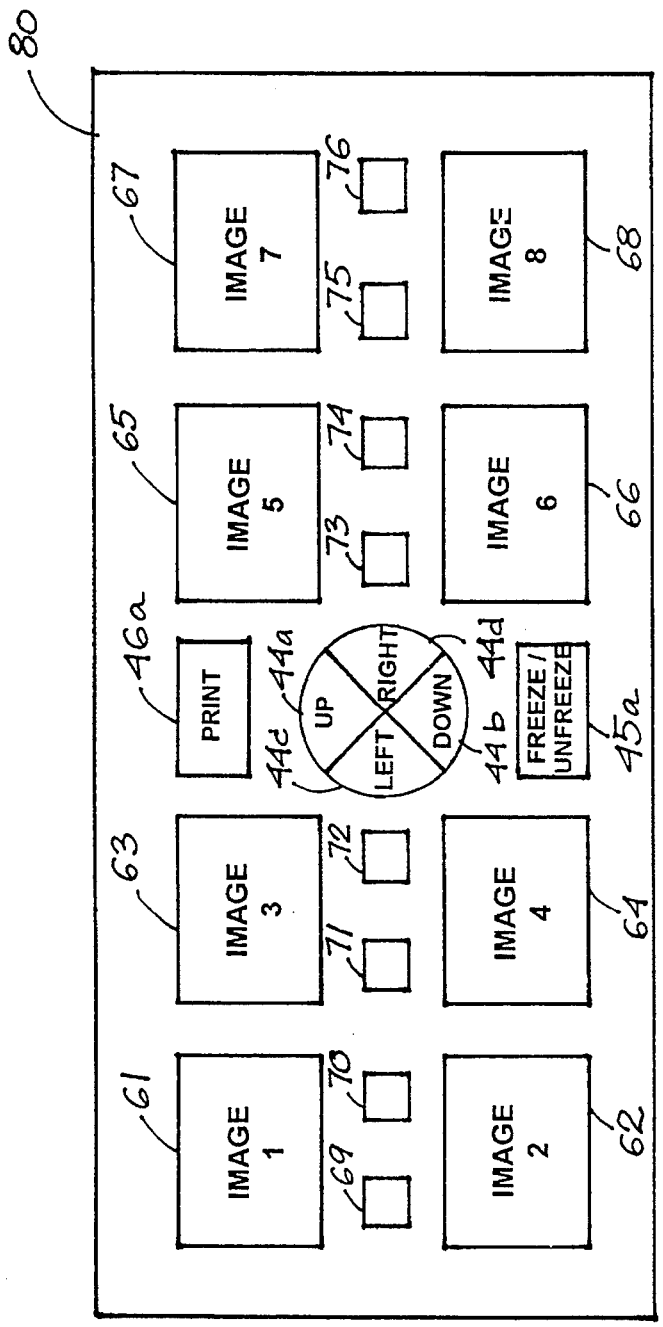
FIG. 2 is a more detailed schematic diagram of a user control panel for the system of FIG. 1 for practicing the methods of this invention.

One potential layout of the user control panel and a self-photography booth for accomplishing the methods of this invention is shown in FIGS. 2 and 3. Control panel 80, FIG. 2, may have all of the user controls. Control panel 80 includes photographs of eight background images 1 through 8, block 61 through 68, respectively. Next to each image is a selection button 69 through 76, respectively, for allowing the user to quickly select from the eight stored images. The user can freeze and unfreeze the live video image using button 45a, and enable the printer using button 46a in conjunction with the acceptance of sufficient money as described below. Finally, control panel 80 includes video camera positioning keys 44a through 44d that move the camera vertically and horizontally to allow the user to position his or her image in the composite image.

A self-photography booth which is capable of accomplishing the system of FIG. 1 is shown in FIG. 3. Booth 100 may be a free-standing booth with monitor screen 32a, lights 22a, video camera 18a, control panel 80a, and bill acceptor 40a. Slot 82 is included as a means of providing printed images for the user.

Figure 4A:
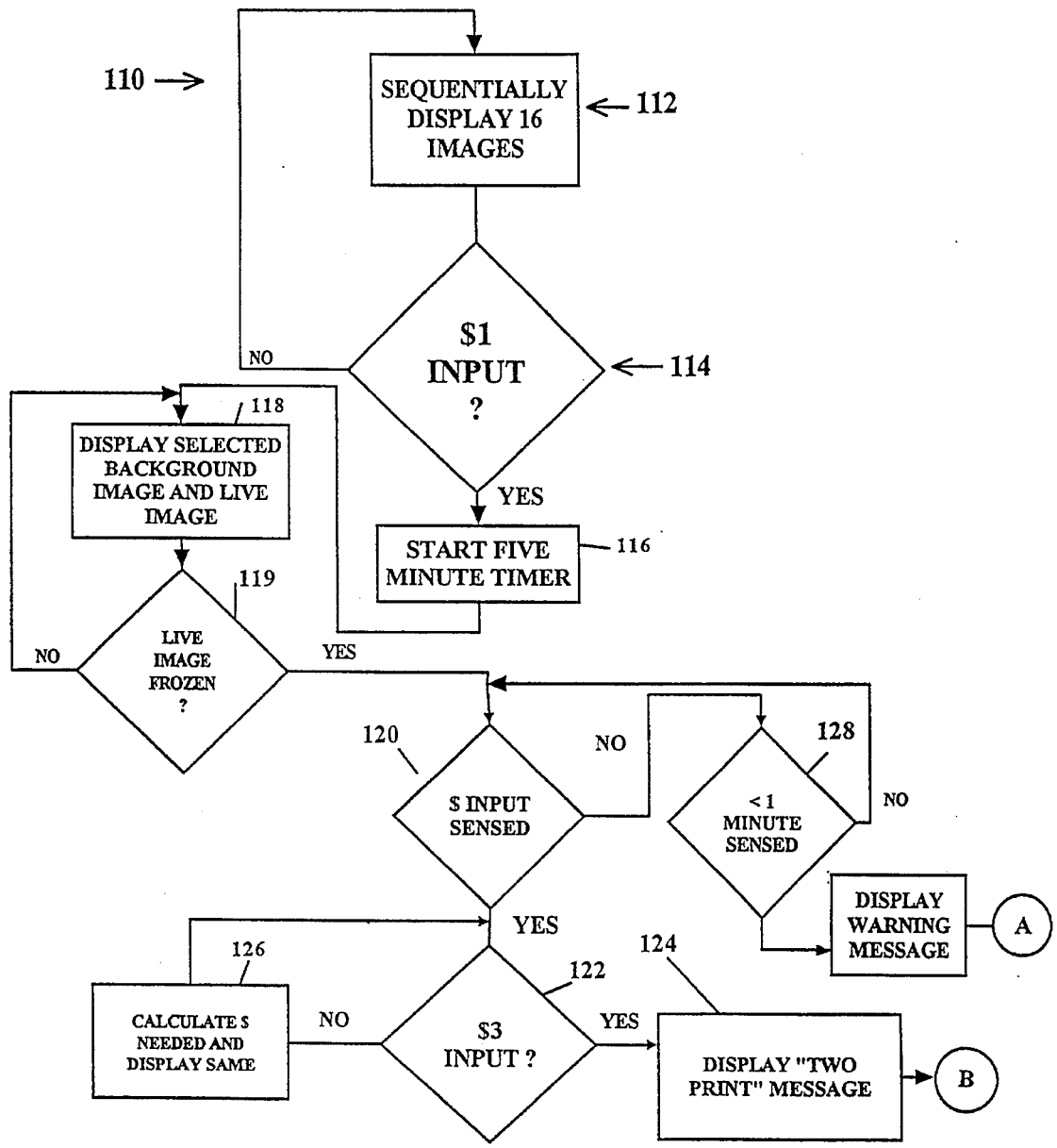
FIGS. 4A and 4B are together a flow chart of a preferred embodiment of a method of operating the system detailed in FIGS. 1 through 3 for accomplishing the methods of this invention.
Figure 4B:
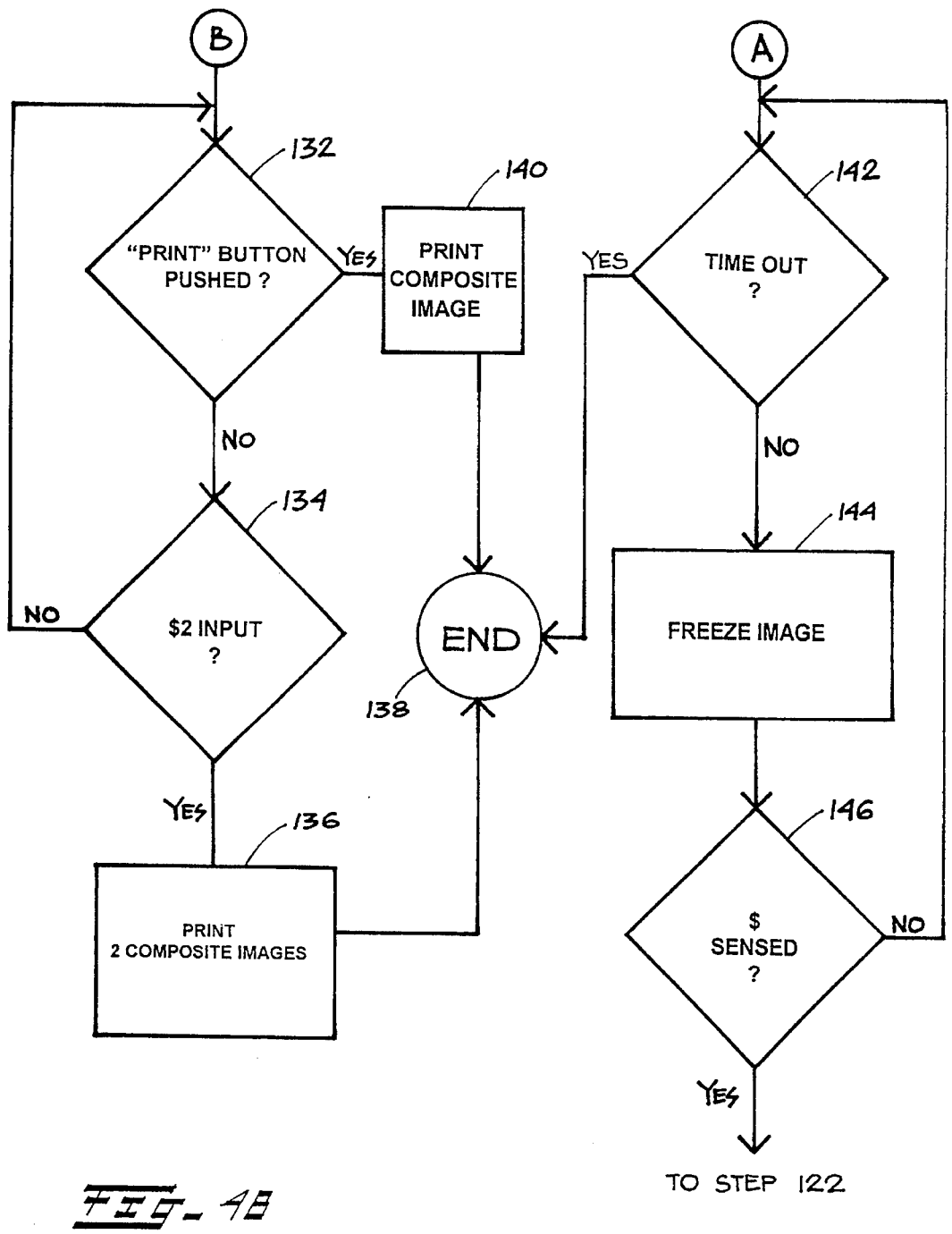

A flow chart of one method according to this invention which uses the system of FIGS. 1 through 3 is shown in FIG. 4. Method 110 includes step 112 of sequentially displaying sixteen stored images comprising the eight stored background images, and eight corresponding, pre-made composite images, one using each of these eight background images. These sixteen images are constantly, sequentially displayed for potential users. When the bill collector senses the input of a dollar bill, step 114, a five minute play timer is started, step 116, and after some use instructions, the currently-selected background image is displayed on the user monitor along with the live image, step 118.

During this five minute period, the user is allowed to select at will from each of the eight stored images, and also allowed to freeze and unfreeze the live image at will, step 119, in order to create a desired composite image. Typically, there is a sign or message on the monitor instructing the user to add a certain amount of money to obtain a print. For example, $3.00 may be required for one print, and $5.00 for two prints of the same composite image. Money may be added only when the live image is frozen. When additional money is sensed, step 120, the system determines whether $3.00 has been input, step 122. If not, the amount of money needed to make up $3.00 is calculated and displayed, step 126, so the user knows how much has been deposited and how much more must be input to obtain a print. Once $3.00 has been input, the system displays a "two print" message, step 124. The "two print" message tells the user that he still has the capability of obtaining two prints for an additional $2.00 input. The user may then add $2.00, step 134, or push the "print" button, step 132, to obtain the single print he has already paid for. Once two additional dollars are input, the system prints two of the composite images, step 136.

When there is less than one minute, or some other preestablished time, left in the five minute play time, step 128, a warning message is displayed, step 130. This warning message will tell the user how much time is left, and may actually count down the number of seconds left for play. The message would warn the user that his play will end unless he inserts $3.00 to obtain a print. If there has been no time out, step 142, the system may also automatically freeze the image one or more times during this one minute period to give the user final opportunities to print a composite image. If during this minute money is input to the booth, step 146, operation returns to step 122 to look for the $3.00 required for a single print. The system could also ask for an additional small amount of money to buy more play time. If no money is sensed and time expires, operation ends.

The system of FIGS. 1 through 3 may also be enabled to store in the memory of computer 12, and print out through printer 1 or 2, for example, certain use information for the booth operator. In one embodiment, this information includes the current date, booth location, and the first date of operation of the booth at that location. The system is enabled to store and print out the total number of pictures printed since the beginning of operation, the number of each of the eight background images printed, the gross amount of money accepted by the unit, the number of times the unit has been used for play by a user without the selection of a print option, the number of single prints selected, and the number of double prints selected.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. A method of creating a composite print including a preestablished background portion and a live portion, comprising the steps of:

providing a plurality of different preestablished background images;

allowing a user to select one background image at a time;

automatically accepting a first sum of money;

obtaining with an imaging device an image of the user;

providing an electronic display device;

creating an electronic composite image or the selected background image and the obtained user image;

displaying on the display device the composite image, but only after the acceptance of the first sum of money;

providing an image printing device;

automatically accepting a second sum of money; and enabling the printing of the composite image on the image printing device, but only after automatically accepting the second sum of money.

2. The method of claim 1 in which the step of providing a plurality of images includes storing the background images in digital form.

3. The method of claim 1 in which the step of allowing the user to select a background image includes displaying each of the background images.

4. The method of claim 3 in which the step of displaying each of the background images includes mounting prints of each background image proximate an image selection device.

5. The method of claim 1 in which the step of allowing a user to select one background image at a time takes place only after the step of automatically accepting a first sum of money.

6. The method of claim 5 in which the step of automatically accepting a second sum of money includes requiring the user to deposit an additional sum of money to enable the printing.

7. The method of claim 6 in which the step of automatically accepting a second sum of money further includes allowing the user to deposit a larger sum of money to obtain more than one print of the composite image.

8. The method of claim 6 further including the step of allowing the user to freeze the user image.

9. The method of claim 8 in which the step of requiring the user to deposit an additional sum of money is dependent on the image being frozen.

10. The method of claim 5 further including the step of limiting the time after the first sum of money is deposited during which the user can select background images for display.

11. The method of claim 10 further including the step of automatically freezing the live image near the end of the limited time to allow the user to view a composite image which can be selected for printing.

12. The method of claim 10 further including the step of warning the user when the limited time is close to expiring.

13. The method of claim 1 in which the step of obtaining an image includes securing a live video image of the user.

14. The method of claim 13 in which the step of displaying a composite image includes providing the user the ability to freeze the live video image to allow the user to view a composite image before printing.

15. The method of claim 13 in which the step of obtaining an image further includes allowing the user to move the video image in relation to the background image to properly position the user image in the background image.

16. The method of claim 1 further including the step of sequentially displaying each of the background images before a user selection of a background image for display.

17. The method of claim 16 in which the sequential display is additionally on a second display device.

18. A method of creating a composite print including a preestablished background portion and a live portion, comprising the steps of:

providing a plurality of different preestablished background images;

providing an electronic display device;

automatically accepting a sum of money, and in response allowing the user a set time period in which to select one background image at a time for display on the display device;

during said set time period obtaining with a video camera a live video image of the user, and displaying on the display device a composite image of the background and live images;

during said set time period providing the user the ability to freeze the live image portion of the displayed composite image for viewing an image for printing;

providing an image printing device; and automatically accepting a second sum of money during the time that the live image is frozen, and in response automatically printing on the image printing device the composite image.

19. A method of creating a composite print including a background portion and a live portion using a self-photography device which includes a number of stored background images, a video camera for capturing a live image of the user, an electronic video display for displaying a composite image of the background and live images, a device for automatically accepting and counting money, and an image printer, the method comprising the steps of:

automatically sensing a first sum of money in the device for accepting money;

allowing the user to select a background image for display on the video display;

displaying on the video display the composite image;

positioning the video camera to place the live image in a desired relationship to the background image on the video display;

freezing the live image to allow the user to view an image for printing; and automatically sensing a second sum of money in the device for accepting money, and in response automatically causing the image printer to print the composite image including the frozen live image.

* * * * *